(12) United States Patent
Hoshino et al.

(10) Patent No.: US 6,926,960 B1
(45) Date of Patent: Aug. 9, 2005

(54) ADHESIVE CLEANING SHEET

(75) Inventors: Eiichi Hoshino, Tochigi (JP); Hironobu Sionome, Tochigi (JP); Koji Hanaoka, Tochigi (JP)

(73) Assignee: KAO Corporation, Tokyo (JP)

(*) Notice: Subject to any disclaimer, the term of this patent is extended or adjusted under 35 U.S.C. 154(b) by 0 days.

(21) Appl. No.: 09/434,124

(22) Filed: Nov. 5, 1999

(51) Int. Cl.$^7$ .................................................. B32B 7/12
(52) U.S. Cl. .................. 428/350; 428/131; 428/212; 428/213; 428/214; 428/220; 428/332; 428/339; 428/340; 428/343; 428/346; 428/354; 428/355 AC; 428/355 R
(58) Field of Search .................... 428/131, 40.1, 428/40.2, 41.3, 41.5, 212, 213, 214, 220, 332, 339, 340, 343, 346, 350, 354, 355 AC, 355 R

(56) References Cited

U.S. PATENT DOCUMENTS

| | | | |
|---|---|---|---|
| 4,464,317 A | * 8/1984 | Thies et al. | 264/4.3 |
| 5,466,465 A | * 11/1995 | Royds et al. | 424/449 |
| 5,536,263 A | * 7/1996 | Rolf et al. | 604/307 |
| 6,576,604 B1 | * 6/2003 | Hoshino et al. | 510/438 |

FOREIGN PATENT DOCUMENTS

| JP | 56090838 | * 7/1981 |
|---|---|---|
| JP | 2567330 | 10/1996 |
| JP | 2633046 | 4/1997 |
| JP | A9140647 | 6/1997 |
| JP | 09228212 | * 9/1997 |
| JP | 10179498 A | * 7/1998 |
| JP | 10179498 | * 7/1998 |

* cited by examiner

Primary Examiner—Elena Tsoy
(74) Attorney, Agent, or Firm—Birch, Stewart, Kolasch & Birch, LLP

(57) ABSTRACT

Disclosed is an adhesive cleaning sheet comprising a supporting sheet, an active ingredient member comprising a mold removing ingredient, and an adhesive member comprising an adhesive, wherein an isolating layer is provided for separating the active ingredient member and the adhesive member. On use, the cleaning sheet is stuck to an object to be cleaned on the adhesive member thereof.

30 Claims, 2 Drawing Sheets

ADHESIVE CLEANING SHEET

BACKGROUND OF THE INVENTION

1. Field of the Invention

This invention relates to an adhesive cleaning sheet with which mold and dirt can be satisfactorily removed with ease and safety and which has satisfactory storage stability.

2. Description of the Related Art

Mold or dirt forming in wet places, such as bathrooms and kitchens, can be removed by spraying or coating with a solution containing a mold removing ingredient, such as hypochlorous acid, and, after a while, washing away. This manner of cleaning involves the following problems. It is very likely that the liquid runs down the wall or is scattered in the air or applied to other places having no mold. It may follow that a satisfactory cleaning effect is not achieved, walls or furniture unintentionally sprayed with the solution may suffer from fading, and a powerful mold removing chemical, being scattered in the air on spraying, could do harm to the body.

It is a conceivable approach to eliminate these problems that a sheet material impregnated with a solution of a mold removing ingredient is stuck to a wall by making use of the tension of the liquid. However, the sheet dries soon and easily separates because of a limited amount of the solution held therein. Besides, this manner of cleaning has inconvenience that a user must impregnate the sheet material with the solution on use.

In order to overcome the disadvantages, Japanese Patent 2567330 and JP-A-9-140647 propose a sheet, etc. comprising a support, such as nonwoven, woven or paper, having a bleaching ingredient and an adhesive, in which the adhesive holds the bleaching ingredient on the support and/or brings the bleaching ingredient into contact with an object of cleaning (a portion to be cleaned). The problem of these techniques is poor storage stability, lying in that the bleaching agent is deactivated with time in the presence of the adhesive.

SUMMARY OF THE INVENTION

Accordingly, an object of the present invention is to provide an adhesive cleaning sheet with which mold and dirt can be removed well with ease and safety and which has satisfactory storage stability.

The above object is accomplished by an adhesive cleaning sheet having a liquid-permeable supporting sheet, an active ingredient member comprising a mold removing ingredient, and a liquid-permeable adhesive member comprising an adhesive, wherein an isolating layer is provided for separating the active ingredient member and the adhesive member, the cleaning sheet being to be stuck to an object of cleaning on the adhesive member thereof on use.

According to the present invention, since the mold removing ingredient is isolated from the adhesive by the isolating layer, it is stable against storage. On use, the cleaning sheet can be stuck onto an object to be cleaned by applying the adhesive member to the object. Therefore, the mold removing ingredient can easily be applied and held to the object without running down or scattering, thereby achieving satisfactory cleaning with safety.

DESCRIPTION OF THE PREFERRED EMBODIMENT

Figure 1:
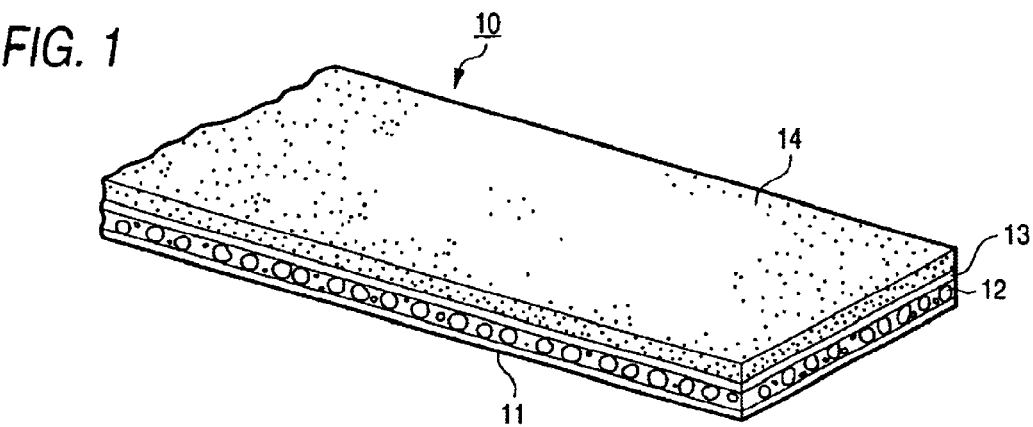
FIG. 1 is a perspective view of the adhesive cleaning sheet according to an embodiment of the present invention.

In an embodiment of the invention, an adhesive cleaning sheet 10 has a liquid-permeable support sheet 11, an active ingredient member 12 comprising a mold removing ingredient, and a liquid-permeable adhesive member 14 comprising an adhesive as shown in FIG. 1. An isolating layer 13 is provided between the active ingredient member 12 and the adhesive member 14 to separate them. The cleaning sheet 10 is stuck to a mold- or dirt-contaminated object on the side of the adhesive member 14.

The active ingredient member 12 is made up of a mold removing ingredient provided in a layer on the surface of the supporting sheet 11. The isolating layer 13 is provided on the active ingredient member 12 to cover that member. The adhesive member 14 is made up of an adhesive provided in a layer on the isolating layer 13.

The supporting sheet 11 preferably has a basis weight of 5 to 200 $g/m^2$, particularly 10 to 100 $g/cm^2$.

The basis weight of the active ingredient member 12 is decided appropriately so that the active ingredient, i.e., a mold removing ingredient, may have a concentration to develop a sufficient mold removing effect upon dissolving in water. Such an effective concentration of the mold removing ingredient in the bleaching solution is expressed in terms of effective oxygen concentration or effective chlorine concentration as hereinafter described. From the standpoint of formability and handling of the cleaning sheet 10, it is preferred for the active ingredient member 12 to have a thickness of not more than 5 mm, particularly 3 mm or less.

The isolating layer 13 preferably has a basis weight of 2 to 100 $g/m^2$, particularly 5 to 70 $g/m^2$.

The basis weight of the adhesive member 14 is appropriately designed so that the adhesive cleaning sheet 10 may stick fast to an object of cleaning on use. In view of formability and handling of the cleaning sheet 10, it is preferred for the adhesive member 14 to have a thickness of not more than 5 mm, particularly 3 mm or less.

The adhesive cleaning sheet 10 composed of these each layers has a total thickness of 0.2 to 10 mm, particularly 0.5 to 5 mm.

The sheet material making the supporting sheet 11 is not particularly limited as long as liquid can pass through it. For example, paper, nonwoven, woven or knitted fabric, film, sponge, and other flexible substrates can be used. Sheeting having per se no permeability to liquid is also made usable by, for example, making perforations through which liquid, such as water, may enter the active ingredient member 12 almost uniformly to let the active ingredient member 12 be activated.

The mold removing ingredient forming the active ingredient member 12 includes ingredients capable of mold removal, bleaching, sterilization, disinfection and/or deodorizing. Examples of such ingredients are chlorine type bleaching ingredients, such as sodium dichloroisocyanurate and chlorinated lime (high granules), and oxygen type bleaching ingredients, such as a combination of sodium percarbonate with an organic peracid precursor (e.g., tetraacetylethylenediamine), and/or an lytic enzyme, and/or an oxidoreductase, etc.

Specific examples of preferred mold removing ingredients are shown in Table 1 below.

referred to as a bleaching solution) is in contact with a portion to be cleaned.

In using a chlorine type bleaching agent, on the other hand, it is preferably used in such an amount to give an effective chlorine concentration of at least 0.1% by weight, particularly 1% by weight or more, when the bleaching solution is in contact to a portion to be cleaned. If the amount

TABLE 1

| Symbol | Mold Removing Ingredient | Structural Formula |
|---|---|---|
| A | sodium percarbonate + tetraacetylethylene-diamine | tetraacetylethylenediamine: 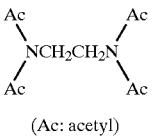 (Ac: acetyl) |
| B | sodium percarbonate + succinic anhydride | succinic anhydride: 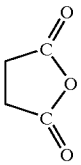 |
| C | sodium percarbonate + organic peracid precursor A | organic peracid precursor A: 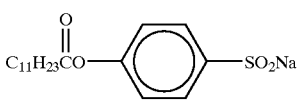 |
| D | sodium percarbonate + organic peracid precursor B | organic peracid precursor B: 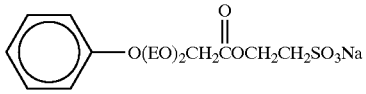 (EO: ethylene oxide) |
| E | sodium dichloroisocyanurate | 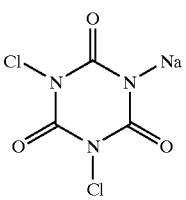 |
| F | chlorinated lime (high granules) | $Ca(OCl)_2$ |

Where an organic acid precursor is used as a mold removing ingredient, it is preferred for the active ingredient member 12 to contain a chelating agent as a stabilizer for the organic peracid produced.

The mold removing ingredient can be prepared in accordance with the kind of ingredient used. For example, in using an oxygen type bleaching ingredient, sodium percarbonate or sodium perborate is preferably used in such an amount to give an effective oxygen concentration of at leas to 0.1% by weight, particularly 0.5% by weight or more, and an organic peracid precursor is preferably used in a molar ratio of 1/1000 or more, particularly 1/500 or more, to the sodium percarbonate or sodium perborate, when a solution exuded from the active ingredient member and the adhesive member by, for example, putting water thereto (hereinafter of the mold removing ingredient is less than the above-described lower limit, the adhesive cleaning sheet 10 tends to fail to exhibit sufficient capability of removing mold or dirt.

Any sheeting material that has liquid permeability in using similarly to the sheeting for forming the supporting sheet 11 can be used for forming the isolating layer 13.

The adhesive member 14 may be designed to have liquid permeability so that the bleaching solution can pass therethrough. The adhesives which can be used to form the adhesive member 14 include hydrophilic or hydrophobic adhesives. Furthermore, the material for the isolating layer 13 in this case is not particularly limited as long as a material that inhibits direct contact between the adhesive member 14 and the active ingredient member 12 and prevents the water content present in a hydrophilic adhesive from migrating to the active ingredient member 12 during storage and that dissolves or collapses easily when the adhesive cleaning sheet 10 is impregnated with liquid or when the sheet 10 is pressed onto an object of cleaning on use.

Suitable hydrophobic adhesives include rubber adhesives, acrylic adhesives, and solution adhesives. The hydrophilic adhesives include those showing sufficient tack even when wetted with liquid such as water, such as (i) polymers having a salt-forming group, (ii) nonionic water-soluble polymers, (iii) gelatin, (iv) emulsion polymers such as an acrylic resin emulsion, and (v) crosslinked products of the polymers (i) to (iv). Preferred hydrophilic adhesives include those shown in Table 2 below and their crosslinked products.

stuck onto a wall, etc. Plasticizers to be incorporated into the adhesive member 14 which are preferred for improving flexibility or formability of the adhesive cleaning sheet itself are polyols for hydrophilic adhesives and fatty acid esters for hydrophobic adhesives.

If desired, the adhesive member 14 can furthermore contain wetting agents, such as surfactants, chelating agents, water, and the like. As previously stated, where an organic peracid precursor is used as a mold removing ingredient, the adhesive member 14 can additionally contain a chelating agent as a stabilizer for the organic peracid produced.

The adhesive cleaning sheet 10 according to the present embodiment is prepared, for example, as follows. A mold removing ingredient is applied on the surface of a supporting sheet 11 by scattering or a like means to form an active

TABLE 2

| No. | Hydrophilic Adhesive | Structural Formula | Mol. Wt. ($\times 10^4$) |
|---|---|---|---|
| 1 | polyvinyl alcohol | $-(CH_2-CH)_n-$ with $OH$ | 8 |
| 2 | polyvinyl pyrrolidone | $-(CH_2-CH)_n-$ with N-pyrrolidone | 23 |
| 3 | | | 63 |
| 4 | polydimethyl-acrylamide | $-(CH_2-CH)_n-$ with $CON(CH_3)_2$ | 28 |
| 5 | | | 90 |
| 6 | | | 100 |
| 7 | sodium styrene-sulfonate/methacrylic acid copolymer | $-(CH_2-CH)_n-(CH_2-C(CH_3)(COOH))_n-$ with phenyl-$SO_3Na$ (m/n = 1/1) | 31 |
| 8 | polymethacryloyl-oxyethyldimethyl-ethylammonium ethylsulfate | $-(CH_2-C(CH_3))_n-$, $O-C(=O)-O-C_2H_4-N^+(C_2H_5)(CH_3)_2$, $C_2H_4SO_4^-$ | 28 |
| 9 | | | 120 |
| 10 | polymethacryloyl-oxyethyltrimethyl-ammonium chloride | $-(CH_2-C(CH_3))_n-$, $O=C-O-C_2H_4-N^+(CH_3)_3$, $Cl^-$ | 22 |
| 11 | Pullulan | | 20 |

If necessary, the adhesive member 14 can further comprise other ingredients, such as plasticizers. In this case, the proportion of the adhesive in the adhesive member 14 is preferably at least 30% by weight. If it is less than 30%, the tack tends to be insufficient for keeping the cleaning sheet ingredient member 12. The surface of the active ingredient member 12 is covered with an isolating layer 13 by lamination. The isolating layer 13 can be fixed on the supporting sheet 11 by heat-sealing or via a hydrophobic adhesive provided on, for example, peripheral portions of the supporting sheet 11 and/or of the insulating layer 13.

Where a hydrophilic adhesive is selected as the adhesive of an adhesive member 14, the hydrophilic adhesive is dissolved in water. The aqueous adhesive solution is compounded with necessary additives, such as a plasticizer or a surfactant as a wetting agent, by stirring. Where necessary, the composition is subjected to crosslinking reaction. The composition is dried and moisture-conditioned to prepare an adhesive composition. The resulting adhesive composition is applied to the surface of the isolating layer 13 to form an adhesive member 14. Or, the above-described aqueous adhesive solution is compounded with the necessary additives to prepare an adhesive composition, which is applied to the isolating layer 13, followed by, if necessary, crosslinking reaction, and drying and moisture conditioning to form the adhesive member 14.

The adhesive composition develops tackiness with a controlled water content. If completely dried, it loses adhesiveness. Too high a water content, on the other hand, not only impairs formability and stability of the adhesive member 14 but extends its influences on the mold removing ingredient of the active ingredient member 12 through the isolating layer 13. It may follow that the mold removing ingredient fails to maintain storage stability. Therefore, it is preferred that the water content of the adhesive composition be as low as is consistent with sufficient self-adhesiveness.

On this viewpoint, a preferred water content of the adhesive composition ranges from 0.1 to 60% by weight, particularly 1 to 30% by weight. The water content can be measured from weight loss on drying at 80° C. or a Karl Fischer's method. The latter method of measurement is preferred for securing accuracy.

The manner of using the adhesive cleaning sheet according to the invention will then be illustrated by referring to removal of mold or dirt on the joints (the portion to be cleaned) of tiles in a bathroom.

The adhesive cleaning sheet 10 according to the present embodiment is pressed onto a joint which is contaminated with mold or dirt with the side of its adhesive member 14 facing the joint, whereby the adhesive member 14 deforms to shape and brought into intimate contact with the joint. Water is applied to the sheet 10 by, for example, showering with tap water. The active ingredient member 12 and the adhesive member 14 are thus wetted, and the sheet 10 is kept stuck as wetted with its adhesive member 14 being in contact with the joint. On wetting with water, the mold removing ingredient of the active ingredient member 12 dissolves to become a solution, which passes through the isolating layer 13 and the adhesive member 14 and reaches the joint. As the cleaning sheet 10 is allowed to stand as stuck and wetted for a while, the joint is cleared of mold or dirt. Use of a hydrophilic adhesive in the adhesive member 14 is very effective in maintaining the wet state. The adhesive cleaning sheet 10 is then removed, and any mold removing ingredient, etc. remaining on the joint is washed away to complete cleaning.

According to the adhesive cleaning sheet 10 of the present embodiment, simply by applying water to the adhesive cleaning sheet 10 to impregnate the active ingredient member 12 comprising a mold removing ingredient and the adhesive member 14 comprising an adhesive with water, the mold removing ingredient dissolves from the active ingredient member 12 and comes into contact with an object of cleaning having mold or dirt thereon in a continuous manner while wet with the adhesive member 14 being kept adhered to the object. Thus, the action of the mold removing ingredient can be manifested effectively. This is advantageous in that mold or dirt could be removed satisfactorily even with an oxygen type bleaching ingredient which is inferior to a chlorine type bleaching ingredient in mold or dirt removing power.

According to the adhesive cleaning sheet 10 of the present embodiment, because all of the adhesive member 14, the isolating layer 13, the active ingredient member 12, and the supporting sheet 11 which constitute the adhesive cleaning sheet have moderate hardness and sufficient flexibility, they are capable of deforming in conformity with an uneven surface of an object of cleaning, such as joints of tiles. Therefore, the sheet 10 effectively performs its cleaning function even on the mold or dirt accumulated in depressions.

Since the adhesive cleaning sheet of the present embodiment has the active ingredient member isolated from the adhesive member, the mold removing ingredient in the active ingredient member is protected against the attack of the adhesive and thereby prevented from deactivation with time during storage. In particular, the mold removing ingredient is protected from the water content originally present in a hydrophilic adhesive and thus prevented from being seriously deactivated with time. Further, since the mold removing ingredient is kept dry until use, which also improves the storage stability of the mold removing ingredient.

According to the adhesive cleaning sheet 10 of the present embodiment, the active ingredient member 12 comprising the mold removing ingredient can be brought into contact with an object of cleaning while being contained within the cleaning sheet 10. Therefore, the cleaning operation with the adhesive cleaning sheet 10 is not accompanied by scatter of the mold removing ingredient. The adhesive cleaning sheet of the invention is of high safety in this respect.

The adhesive cleaning sheet according to the present embodiment does not cause the mold removing ingredient to scatter and hardly causes the mold removing ingredient to run down. As a result, it supplies the mold removing ingredient to an object of cleaning in a higher concentration to remove mold and dirt more effectively with higher safety than by a conventional manner of cleaning.

The means for holding the adhesive cleaning sheet onto an object of cleaning is not limited to the adhesive member having self-adhesiveness. That is, the adhesive cleaning sheet can be stuck to an object of cleaning by the adhesive member's deforming to the surface unevenness of an object of cleaning, such as the joints of tiles or walls, and being pressed into the depressions.

The above-described embodiment of the invention may be modified in such a manner that the supporting sheet 11 and the isolating layer 13 are both made of a liquid-impermeable material, and liquid such as water is to penetrate into these elements from their peripheral sides. In other words, the term "liquid-permeability" is not necessarily intended to mean that the sheet should be uniformly permeable to liquid over the entire surface thereof.

While the adhesive cleaning sheet of the above-described embodiment of the present invention has been described with a particular embodiment in which the sheet is impregnated with liquid such as water, it is possible to use the adhesive cleaning sheet without applying liquid. Such a modification can be achieved by an embodiment in which the active ingredient member 12 is made of a high concentration mold removing ingredient, the isolating layer 13 is made of a material having low gas barrier properties, and the adhesive member 14 is made of a material that exhibits strong self-adhesiveness without liquid. In this case, mold or dirt can be removed without the aid of an impregnating liquid through such a mechanism as reaction between the mold removing ingredient in the active ingredient member 12 with, for example, moisture in air.

The adhesive cleaning sheet composed of the supporting sheet 11, active ingredient member 12, isolating layer 13, and adhesive member 14 is not limited in form. It can be supplied as cut lengths or a roll of a continuous sheet, a tape, etc. which can be cut to a desired size or length according to necessity.

Figure 2:
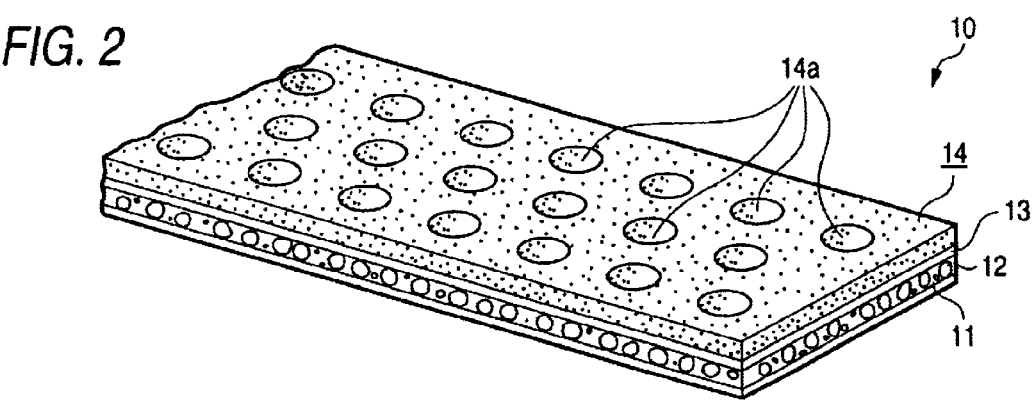
FIG. 2 is a perspective view of the adhesive cleaning sheet according to another embodiment of the present invention.
Figure 3:
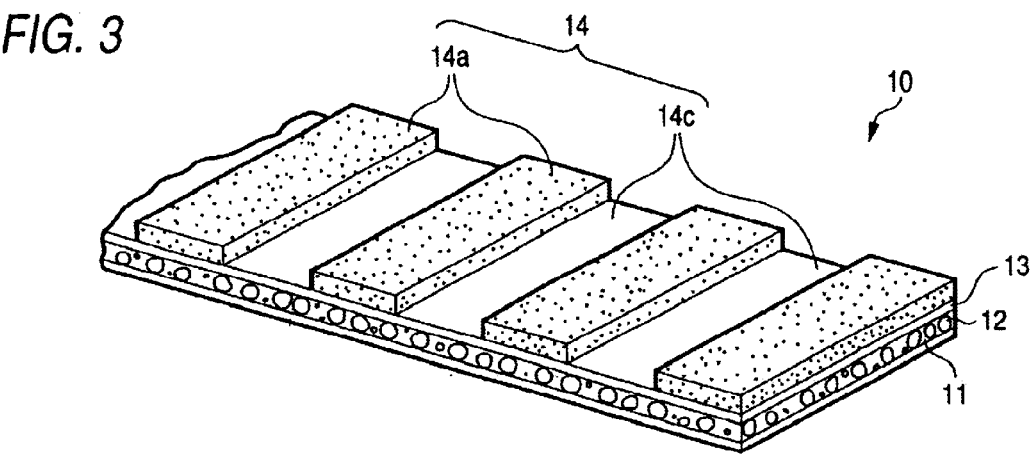
FIG. 3 is a perspective view of the adhesive cleaning sheet according to still another embodiment of the present invention.

The adhesive member 14 can take various forms as long as it is permeable to liquid, i.e., as long as it has a structure allowing the bleaching solution prepared in situ to pass through. For example, as shown in FIG. 2, the adhesive member 14 can be a perforated structure having a plurality of through-holes 14a for liquid passage. As shown in FIG. 3, the adhesive member 14 may be a plurality of adhesive bands 14b arranged in parallel in the width direction of the isolating layer 13, with the isolating layer 13 being exposed in members 14c. The adhesive bands 14b may be arranged along the longitudinal direction.

Figure 4:
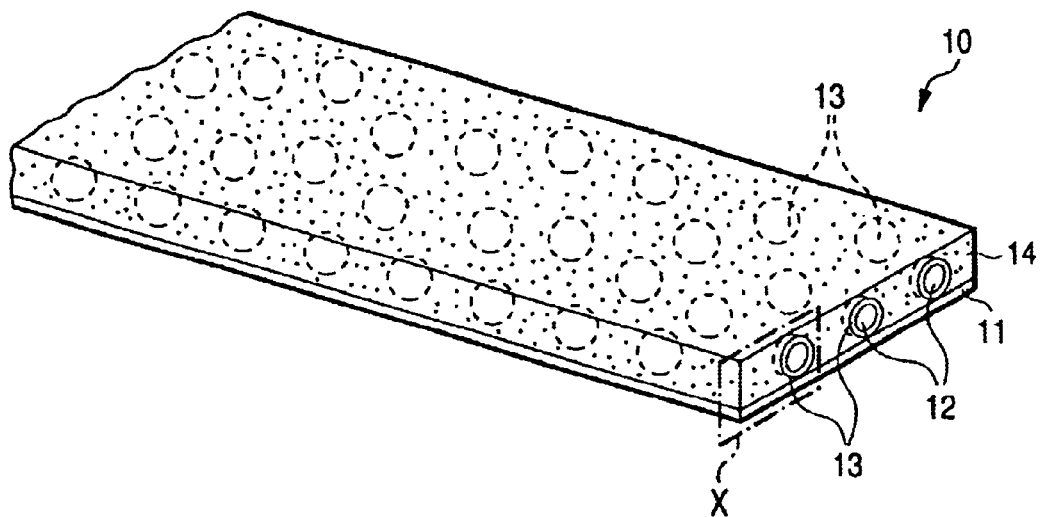
FIG. 4 is a perspective view of the adhesive cleaning sheet according to yet another embodiment of the present invention.
Figure 5:
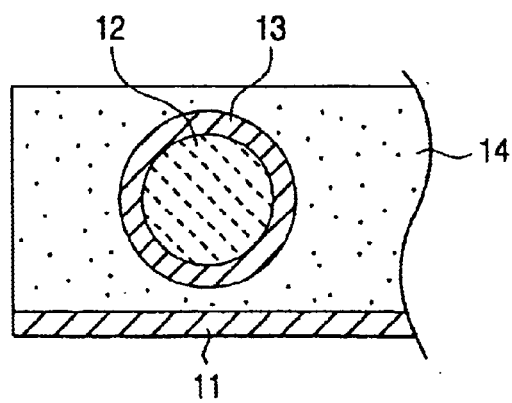
FIG. 5 is an enlarged view of X in FIG. 4.

As shown in FIGS. 4 and 5, the adhesive member 14 may be a layer of an adhesive provided directly on the surface of the supporting sheet 11, and the active ingredient member 12 may be a great number of particles dispersed in the adhesive member 14, the outer surface of each particle being encapsulated with an isolating layer 13. The isolating layer 13 may be provided so as to coat the outer surface of the active ingredient member 12. Furthermore, the material for the isolating layer 13 in this case is not particularly limited as long as a material that inhibits direct contact between the adhesive member 14 and the active ingredient member 12 and prevents the water content present in a hydrophilic adhesive from migrating to the active ingredient member 12 during storage and that dissolves or collapses easily when the adhesive cleaning sheet 10 is impregnated with liquid or when the sheet 10 is pressed onto an object of cleaning on use. High-molecular polyhydric alcohols, such as high-molecular polyethylene glycol, and other film-forming materials generally used for microcapsulation are preferably used.

While the adhesive cleaning sheet according to the present invention is useful in removing mold or dirt on a variety of sites, it is particularly advantageous when applied to cleaning of walls and especially suited to use in warm and wet places, such as a kitchen and a bathroom. It can be stuck to a garbage can, etc. for the purpose of sterilization, disinfection or deodorizing.

The invention will now be illustrated in greater detail with reference to Examples, but it should be understood that the invention is not deemed to be limited thereto. Unless otherwise noted, all the parts and percents are given by weight.

EXAMPLES 1 TO 11

Each of the mold removing ingredients A to F shown in Table 1 above was scattered on a supporting sheet, spun lace nonwoven made of rayon/polyethylene terephthalate polyethylene (70/30) core/sheath conjugate fibers (produced by Daiwabo Polytec) and having a basis weight of 40/gm$^2$, to form an active ingredient layer having a thickness of about 1 mm. The amount of each mold removing ingredient was selected so that a surface to be cleaned might be supplied with an aqueous bleaching solution containing about 1.3% of sodium percarbonate in terms of an effective oxygen concentration and an equimolar amount of the organic peracid precursor or an aqueous solution of a chlorine type bleaching ingredient having an effective chlorine concentration of about 4%. More specifically, the mold removing ingredient was scattered in an amount of 0.03 to 0.05 g per cm$^2$.

The same spun lace nonwoven as used above was laid on the active ingredient layer and heat-sealed at the peripheries to provide an insulating layer.

A 10 to 50% aqueous solution of the hydrophilic adhesive shown in Table 2 above was prepared. Into the aqueous solution were mixed by stirring 10 parts of glycerol (plasticizer) and 3 parts of polyoxyethylene hydrogenated castor oil (surfactant Emanon CH-25, produced by Kao Corp.) per 100 parts of the hydrophilic adhesive. The mixture was dried at 60 to 80° C. for about 2 hours and then conditioned at 20° C. and 60% RH for about 1 hour to prepare an adhesive composition. The resulting adhesive composition was applied to the insulating layer (spun lace nonwoven) to a coating thickness of 1 mm to form an adhesive layer. Thus, combinations of 11 adhesives and 6 active ingredients gave 66 kinds of adhesive cleaning sheets as shown in Table 3 below.

COMPARATIVE EXAMPLES 1 TO 11

An adhesive composition was prepared in the same manner as in Examples 1 to 11. The adhesive composition was applied to the same spun lace nonwoven as used in Examples to a coating thickness of 1 mm. Each of the mold removing ingredients A to F shown in Table 1 was scattered thereon to form an active ingredient layer. The amount of each mold removing ingredient to be scattered was selected so that a surface to be cleaned might be supplied with an aqueous bleaching solution containing about 1.3% of sodium percarbonate in terms of an effective oxygen concentration and an equimolar amount of the organic peracid precursor or an aqueous solution of a chlorine type bleaching ingredient having an effective chlorine concentration of about 4%. More specifically, the mold removing ingredient was scattered in an amount of 0.03 to 0.05 g per cm$^2$. Thus, combinations of 11 adhesives and 6 active ingredients gave 66 kinds of comparative adhesive cleaning sheets having no isolating layer as shown in Table 4 below.

EXAMPLE 12 AND COMPARATIVE EXAMPLE 12

Six kinds of adhesive cleaning sheets were prepared in the same manner as in Examples 1 to 11, except for using the following adhesive composition. Similarly, six kinds of comparative adhesive cleaning sheets were prepared in the same manner as in Comparative Examples 1 to 11, except for using the following adhesive composition.

Adhesive Composition

A 25% aqueous solution of the hydrophilic adhesive 7 shown in Table 2 was mixed by stirring with 45 parts of glycerol (plasticizer) and 3 parts of the surfactant Emanone per 100 parts of the adhesive 7. Into the mixture was further mixed by stirring 1 part of an epoxy crosslinking agent (Denacol EX-521, produced by Nagase Kasei Kogyo) per 100 parts of the adhesive 7, followed by allowing the mixture to crosslink at 90° C. for about 2 hours to obtain an adhesive composition of a crosslinked polymer.

Evaluation

Each of the adhesive cleaning sheets obtained in Examples 1 to 12 and Comparative Examples 1 to 12 was subjected to a mold bleaching test according to the following methods immediately after the preparation and after storage at 40° C. for 2 weeks. Further, the odor of the samples was evaluated as follows. For comparison, a commercially available mold remover Kabi Killer (a product of Johnson & Johnson) was evaluated in the same manner (Comparative Example 13). The results obtained are shown in Tables 3 and 4.

1) Mold Bleaching Test

A porous ceramic plate was inoculated with *Cladosporium herbarum* and incubated at 30° C. for 14 days to prepare a mold model. The moldy plate was set upright, and the adhesive cleaning sheet was stuck thereto and showered with water. After 1 hour standing, the cleaning sheet was removed, and the plate was washed with water and air-dried.

The lightness (L value) of the ceramic plate thus cleaned was measured with a colorimeter 1001DP (manufactured by Nippon Denki Kogyo). The L value of the porous ceramic plate before inoculation was 94, and that of the plate with the mold model was 60 to 65. The greater the L value after cleaning, the higher the mold and dirt removing power.

2) Evaluation of Odor

The irritating or bad odor gave off in the above-described cleaning operation was organoleptically judged by 10 panel members according to the following rating system. The rates given by the panel were averaged.

A . . . Bearable
B . . . Slightly irritating
C . . . Irritating
D . . . Unbearably strong

TABLE 3

| | | Mold Removing Agent | | | | | | | | | | | | | | | | | |
|---|---|---|---|---|---|---|---|---|---|---|---|---|---|---|---|---|---|---|---|
| | | A | | B | | | C | | | D | | E | | | F | | | | |
| | | 0 Dy | 2 Wks | 0 Dy | | 2 Wks | 0 Dy | | 2 Wks | 0 Dy | 2 Wks | 0 Dy | | 2 Wks | 0 Dy | | 2 Wks | 0 Dy | 2 Wks |
| Ex. No. | Adhesive | L Value | Odor | L Value | L Value | Odor | L Value | L Value | Odor | L Value | L Value | Odor | L Value | L Value | Odor | L Value | L Value | Odor | L Value |
| 1 | 1 | 91 | B | 90 | 90 | A | 88 | 88 | A | 88 | 90 | A | 89 | 92 | C | 90 | 92 | C | 91 |
| 2 | 2 | 93 | B | 92 | 92 | A | 91 | 90 | A | 90 | 93 | A | 92 | 93 | C | 91 | 93 | C | 92 |
| 3 | 3 | 93 | B | 93 | 92 | A | 92 | 90 | A | 90 | 92 | A | 92 | 93 | C | 93 | 93 | C | 93 |
| 4 | 4 | 93 | B | 92 | 92 | A | 91 | 90 | A | 90 | 93 | A | 93 | 93 | C | 92 | 93 | C | 93 |
| 5 | 5 | 93 | B | 93 | 93 | A | 93 | 91 | A | 91 | 93 | A | 93 | 93 | C | 92 | 93 | C | 93 |
| 6 | 6 | 93 | B | 93 | 93 | A | 93 | 91 | A | 91 | 93 | A | 93 | 93 | C | 93 | 93 | C | 93 |
| 7 | 7 | 93 | B | 93 | 92 | A | 92 | 90 | A | 89 | 92 | A | 92 | 93 | C | 92 | 93 | C | 92 |
| 8 | 8 | 93 | B | 91 | 93 | A | 91 | 91 | A | 91 | 93 | A | 92 | 93 | C | 92 | 93 | C | 91 |
| 9 | 9 | 93 | B | 92 | 93 | A | 92 | 91 | A | 91 | 92 | A | 92 | 93 | C | 93 | 93 | C | 92 |
| 10 | 10 | 94 | B | 93 | 94 | A | 94 | 92 | A | 91 | 94 | A | 94 | 94 | C | 92 | 94 | C | 92 |
| 11 | 11 | 94 | B | 93 | 94 | A | 94 | 92 | A | 90 | 94 | A | 93 | 94 | C | 92 | 94 | C | 92 |
| 12 | 7* | 94 | B | 94 | 94 | A | 94 | 93 | A | 93 | 94 | A | 94 | 94 | C | 94 | 94 | C | 94 |

7*: Crosslinked sodium styrenesulfonate/methacrylic acid copolymer

TABLE 4

| | | Mold Removing Agent | | | | | | | | | | | | | | | | | |
|---|---|---|---|---|---|---|---|---|---|---|---|---|---|---|---|---|---|---|---|
| | | A | | B | | | C | | | D | | E | | | F | | | | |
| Compar. | | 0 Dy | 2 Wks | 0 Dy | | 2 Wks | 0 Dy | | 2 Wks | 0 Dy | 2 Wks | 0 Dy | | 2 Wks | 0 Dy | | 2 Wks | 0 Dy | 2 Wks |
| Ex. No. | Adhesive | L Value | Odor | L Value | L Value | Odor | L Value | L Value | Odor | L Value | L Value | Odor | L Value | L Value | Odor | L Value | L Value | Odor | L Value |
| 1 | 1 | 90 | B | 72 | 90 | A | 71 | 88 | A | 70 | 89 | A | 73 | 89 | C | 75 | 90 | C | 75 |
| 2 | 2 | 92 | B | 75 | 92 | A | 74 | 90 | A | 73 | 91 | A | 75 | 91 | C | 76 | 92 | C | 77 |
| 3 | 3 | 92 | B | 78 | 92 | A | 77 | 90 | A | 77 | 91 | A | 76 | 91 | C | 77 | 92 | C | 78 |
| 4 | 4 | 92 | B | 75 | 92 | A | 74 | 90 | A | 72 | 91 | A | 75 | 91 | C | 76 | 92 | C | 76 |
| 5 | 5 | 93 | B | 79 | 93 | A | 78 | 91 | A | 78 | 92 | A | 77 | 92 | C | 77 | 93 | C | 78 |
| 6 | 6 | 93 | B | 79 | 93 | A | 79 | 91 | A | 79 | 92 | A | 78 | 92 | C | 77 | 93 | C | 79 |
| 7 | 7 | 92 | B | 74 | 92 | A | 75 | 90 | A | 74 | 91 | A | 74 | 91 | C | 75 | 92 | C | 77 |
| 8 | 8 | 93 | B | 73 | 93 | A | 73 | 91 | A | 72 | 92 | A | 74 | 92 | C | 75 | 93 | C | 76 |
| 9 | 9 | 93 | B | 80 | 93 | A | 78 | 91 | A | 79 | 92 | A | 79 | 92 | C | 78 | 93 | C | 79 |
| 10 | 10 | 94 | B | 72 | 94 | A | 73 | 92 | A | 71 | 93 | A | 73 | 93 | C | 74 | 94 | C | 76 |
| 11 | 11 | 94 | B | 75 | 94 | A | 74 | 92 | A | 73 | 93 | A | 74 | 93 | C | 74 | 94 | C | 76 |
| 12 | 7* | 94 | B | 80 | 94 | A | 79 | 92 | A | 78 | 93 | A | 80 | 93 | C | 76 | 94 | C | 80 |
| 13 | | 93 | D | — | — | — | — | — | — | — | — | — | — | — | — | — | — | — | — |

7*: Crosslinked sodium styrenesulfonate/methacrylic acid copolymer

In Comparative Example 13, the plate set upright was sprayed with a standard amount of Kabi Killer and, after 1 hour standing, washed with water and air-dried.

It is seen from the results in Tables 3 and 4 that the adhesive cleaning sheets according to the present invention are superior to the comparative samples, performing excellent ability in removing dirt and mold even after storage for a given time. Further, even where a chlorine type bleaching ingredient emitting an irritating odor is used, the odor generated from the adhesive cleaning sheets of the invention on use is reduced as compared with the spray type mold remover.

While the invention has been described in detail and with reference to specific examples thereof, it will be apparent to one skilled in the art that various changes and modifications can be made therein without departing from the spirit and scope thereof.

What is claimed is:

1. An adhesive mold removing cleaning assembly comprising:
   a liquid-permeable supporting sheet having a basis weight of 5 to 200 g/m$^2$;
   an active ingredient member comprising a mold removing ingredient, said active ingredient member having a thickness of not more than 5 mm;
   a liquid-permeable adhesive member having a thickness of not more than 5 mm comprising a hydrophilic adhesive and a polyol plasticizer; and
   an isolating layer having a basis weight of 2 to 100 g/m$^2$ which separates said active ingredient member from said adhesive member but which permits migration of said mold removing ingredient to at least a portion of said adhesive upon use;
   wherein said hydrophilic adhesive is at least 30% by weight of said liquid-permeable adhesive member, said hydrophilic adhesive has a water content of 0.1% to 60% by weight,
   wherein said adhesive member substantially covers one side of said isolating layer, and
   said cleaning assembly upon use being adhered to an object to be cleaned by applying the adhesive member to a mold-containing surface of the object whereby at least a portion of said adhesive contacts said mold and thereafter applying water thereto whereby said mold-removing ingredient passes through said adhesive to contact said mold.

2. An adhesive cleaning assembly according to claim 1, wherein said mold removing ingredient is provided on said supporting sheet, said isolating layer is provided on said active ingredient member to cover said active ingredient member, and said adhesive is provided on said isolating layer to form said adhesive member.

3. An adhesive cleaning assembly according to claim 1, wherein said adhesive member has a perforated structure having through-holes.

4. An adhesive cleaning assembly according to claim 1, wherein said adhesive member is a plurality of adhesive bands arranged in parallel in a width direction of said isolating layer.

5. The adhesive cleaning assembly according to claim 1, wherein said hydrophilic adhesive is selected from the group consisting of (i) a polymer having a salt-forming group, (ii) a nonionic water-soluble polymer, (iii) gelatin, (iv) an emulsion polymer, and (v) a crosslinked product of the polymers (i) to (iv).

6. The adhesive cleaning assembly according to claim 1, wherein said hydrophilic adhesive is a sodium styrenesulfonate/methacrylic acid copolymer.

7. The adhesive cleaning assembly according to claim 1, wherein said adhesive member further comprises an ingredient selected from the group consisting of a surfactant, a chelating agent and water.

8. The adhesive cleaning assembly according to claim 1, wherein said water content of said hydrophilic adhesive is 1% to 30% by weight.

9. An adhesive mold removing cleaning assembly comprising:
   a) a liquid-permeable supporting sheet having a basis weight of 5 to 200 g/m$^2$;
   b) an active ingredient-containing sheet comprising a mold removing ingredient;
   c) an adhesive layer having a thickness of not more than 5 mm comprising a hydrophilic adhesive and a polyol plasticizer; and
   d) an isolating layer which separates said active ingredient member from said adhesive layer but which permits migration of said mold removing ingredient to at least a portion of said adhesive layer upon use;
   wherein said hydrophilic adhesive comprises at least 30% by weight of said adhesive layer c),
   wherein said active ingredient-containing sheet b) is laminated to said isolating layer d), whereby the surface of said active ingredient-containing sheet b) is covered with said isolating layer d), with said adhesive layer covering at least a portion of said isolating layer opposite of said active ingredient-containing sheet, and
   at least a portion of said adhesive of said adhesive mold removing cleaning assembly upon use being adhered to the surface of an object to be cleaned by contacting at least a portion of said liquid-permeable adhesive layer c) thereof with a mold-containing surface of the object and thereafter applying water thereto whereby said mold-removing ingredient passes through said adhesive to contact said mold.

10. The adhesive mold removing cleaning assembly of claim 1, wherein said isolating layer comprises spun lace nonwoven.

11. The adhesive mold removing cleaning assembly of claim 9, wherein said isolating layer comprises spun lace nonwoven.

12. An adhesive mold removing cleaning assembly comprising:
   a liquid-permeable supporting sheet having a basis weight of 5 to 200 g/m$^2$;
   an adhesive layer having a thickness of not more than 5 mm comprising a hydrophilic adhesive and a polyol plasticizer;
   said hydrophilic adhesive having admixed therewith a multitude of particles of a mold removing ingredient;
   wherein said hydrophilic adhesive is at least 30% by weight of said adhesive layer and has a water content of 0.1% to 60% by weight;
   the surface of each of said mold removing particles being coated with a water-soluble isolating layer to prevent contact between said mold removing particles and said hydrophilic adhesive;
   said cleaning assembly upon use being adhered to the surface of an object to be cleaned by applying the adhesive layer thereof to a mold-containing surface of the object whereby at least a portion of said adhesive contacts said mold and applying water thereto whereby said mold removing ingredient passes through said adhesive to contact said mold, and
   wherein said adhesive layer has a perforated structure having through-holes.

13. The adhesive cleaning assembly according to claim 12, wherein said hydrophilic adhesive is selected from the group consisting of (i) a polymer having a salt-forming group, (ii) a nonionic water-soluble polymer, (iii) gelatin, (iv) an emulsion polymer, and (v) a crosslinked product of the polymers (i) to (iv).

14. The adhesive cleaning assembly according to claim 12, wherein said hydrophilic adhesive is a sodium styrenesulfonate/methacrylic acid copolymer.

15. The adhesive cleaning assembly according to claim 12, wherein said adhesive layer further comprises an ingredient selected from the group consisting of a surfactant, a chelating agent and water.

16. The adhesive cleaning assembly according to claim 12, wherein said water content of said hydrophilic adhesive is 1% to 30% by weight.

17. The adhesive cleaning assembly according to claim 1, wherein said assembly has a thickness of from 0.2 to 10 mm.

18. The adhesive cleaning assembly according to claim 9, wherein said assembly has a thickness of from 0.2 to 10 mm.

19. The adhesive cleaning assembly according to claim 17, wherein said assembly has a thickness of from 0.2 to 10 mm.

20. The adhesive mold removing cleaning assembly of claim 9, wherein said adhesive layer has a perforated structure having through-holes.

21. The adhesive mold removing cleaning assembly of claim 9, wherein said adhesive layer comprises a plurality of spaced-apart adhesive bands.

22. The adhesive mold removing cleaning assembly of claim 12, wherein said adhesive layer comprises a plurality of spaced-apart adhesive bands.

23. An adhesive mold removing cleaning assembly comprising:
a liquid-permeable supporting sheet having a basis weight of 5 to 200 g/m$^2$;
an adhesive layer having a thickness of not more than 5 mm comprising a hydrophilic adhesive and a polyol plasticizer;
said hydrophilic adhesive having admixed therewith a multitude of particles of a mold removing ingredient;
wherein said hydrophilic adhesive is at least 30% by weight of said adhesive layer and has a water content of 0.1% to 60% by weight;
the surface of each of said mold removing particles being coated with a water-soluble isolating layer to prevent contact between said mold removing particles and said hydrophilic adhesive;
said cleaning assembly upon use being adhered to the surface of an object to be cleaned by applying the adhesive layer thereof to a mold-containing surface of the object whereby at least a portion of said adhesive contacts said mold and applying water thereto whereby said mold removing ingredient passes through said adhesive to contact said mold, and
wherein said adhesive layer comprises a plurality of spaced-apart adhesive bands.

24. The adhesive cleaning assembly according to claim 23, wherein said hydrophilic adhesive is selected from the group consisting of (i) a polymer having a salt-forming group, (ii) a nonionic water-soluble polymer, (iii) gelatin, (iv) an emulsion polymer, and (v) a crosslinked product of the polymers (i) to (iv).

25. The adhesive cleaning assembly according to claim 23, wherein said hydrophilic adhesive is a sodium styrenesulfonate/methacrylic acid copolymer.

26. The adhesive cleaning assembly according to claim 23, wherein said adhesive layer further comprises an ingredient selected from the group consisting of a surfactant, a chelating agent and water.

27. The adhesive cleaning assembly according to claim 23, wherein said water content of said hydrophilic adhesive is 1% to 30% by weight.

28. The adhesive cleaning assembly according to claim 23, wherein said assembly has a thickness of from 0.2 to 10 mm.

29. The adhesive mold removing cleaning assembly of claim 12, wherein said isolating layer comprises a polyhydric alcohol.

30. The adhesive mold removing cleaning assembly of claim 29, wherein said polyhydric alcohol is a polyethylene alcohol.

* * * * *